United States Patent
Nakata

(10) Patent No.: US 9,473,262 B2
(45) Date of Patent: Oct. 18, 2016

(54) OPTICAL COMMUNICATION APPARATUS, OPTICAL COMMUNICATION SYSTEM, AND PATH CONTROL METHOD

(75) Inventor: Takeshi Nakata, Tokyo (JP)

(73) Assignee: NEC CORPORATION, Tokyo (JP)

(*) Notice: Subject to any disclaimer, the term of this patent is extended or adjusted under 35 U.S.C. 154(b) by 582 days.

(21) Appl. No.: 13/610,476

(22) Filed: Sep. 11, 2012

(65) Prior Publication Data

US 2013/0077969 A1  Mar. 28, 2013

(30) Foreign Application Priority Data

Sep. 22, 2011 (JP) .................. 2011-208166

(51) Int. Cl.
*H04J 14/00* (2006.01)
*H04J 14/02* (2006.01)

(52) U.S. Cl.
CPC ........ H04J 14/0212 (2013.01); H04J 14/0217 (2013.01); *H04J 14/021* (2013.01)

(58) Field of Classification Search
CPC ............... H04J 14/0212; H04J 14/021; H04J 14/0283; H04J 14/0217; H04J 14/02; H04J 3/0682; H04J 14/022; H04Q 11/0005; H04Q 2011/0018; H04B 10/40; H04B 10/506; H04B 10/27; H04L 12/44; G02B 6/29395; G02B 6/356
USPC ......... 398/83, 135, 138, 139, 45–50, 51, 54, 398/58, 79
See application file for complete search history.

(56) References Cited

U.S. PATENT DOCUMENTS

| | | | | |
|---|---|---|---|---|
| 6,072,610 A * | 6/2000 | Kuroyanagi | ........ | H04J 14/0291 398/1 |
| 6,130,764 A * | 10/2000 | Taniguchi | ............... | H04L 12/44 370/535 |
| 6,990,294 B2 | 1/2006 | Ikoma et al. | | |
| 7,953,106 B2 * | 5/2011 | Suzuki | .................. | H04L 49/352 370/463 |
| 8,009,986 B2 * | 8/2011 | Chang | ................... | H04J 14/021 398/79 |
| 8,346,089 B2 * | 1/2013 | Wisseman | ...................... | 398/83 |
| 8,396,362 B2 | 3/2013 | Nagaki et al. | | |
| 8,693,880 B2 | 4/2014 | Sakauchi et al. | | |
| 8,964,581 B2 | 2/2015 | Takara et al. | | |

(Continued)

FOREIGN PATENT DOCUMENTS

| | | |
|---|---|---|
| JP | 2002-223197 A | 8/2002 |
| JP | 2006-041921 A | 2/2006 |

(Continued)

OTHER PUBLICATIONS

"Performance of Dual-Polarization QPSK for Optical transport systems," Kim Roberts, Maurice O'Sullivan, Kuang-Tsan Wu, Han Sun, Ahmed Awadalla, David J. Krause, and Charles Laperle, Journal of Lightwave Technology, vol. 27. No. 16, Aug. 15, 2009.

(Continued)

*Primary Examiner* — Hibret Woldekidan
(74) *Attorney, Agent, or Firm* — McGinn IP Law Group, PLLC

(57) ABSTRACT

An optical communication apparatus of a wavelength division multiplexing transmission system has a transponder having a double-wavelength tunable transceiver and a transceiver including a switching controller, and a ROADM device having a device that copes with a colorless function and a directionless function and can operate in cooperation with the transponder.

16 Claims, 17 Drawing Sheets

(56) References Cited

U.S. PATENT DOCUMENTS

| | | | |
|---|---|---|---|
| 9,209,901 B2* | 12/2015 | Dahlfort | H04B 10/40 |
| 9,240,856 B2* | 1/2016 | Mizutani | H04J 14/0257 |
| 9,301,027 B2* | 3/2016 | Kauffeldt | H04Q 11/0005 |
| 2002/0097460 A1 | 7/2002 | Ikoma et al. | |
| 2008/0050117 A1* | 2/2008 | Koley | H04J 14/0227 398/49 |
| 2008/0131130 A1* | 6/2008 | Chang | H04J 14/0212 398/83 |
| 2009/0116839 A1* | 5/2009 | Kikuchi | H04J 14/02 398/79 |
| 2009/0220242 A1 | 9/2009 | Ooi et al. | |
| 2009/0238089 A1* | 9/2009 | Kitajima | H04L 49/1507 370/252 |
| 2010/0209113 A1 | 8/2010 | Nagaki et al. | |
| 2010/0232782 A1* | 9/2010 | Natori | H04J 14/0297 398/2 |
| 2010/0322354 A1* | 12/2010 | Tanimoto | H04B 1/74 375/340 |
| 2011/0116790 A1* | 5/2011 | Sakauchi | H04J 14/0204 398/5 |
| 2011/0262142 A1* | 10/2011 | Archambault | H04J 14/02 398/83 |
| 2011/0274425 A1* | 11/2011 | Grobe | H04J 14/0212 398/3 |
| 2011/0293279 A1* | 12/2011 | Lam | H04J 14/0279 398/79 |
| 2011/0317998 A1* | 12/2011 | Fujimura | H04J 3/0682 398/25 |
| 2012/0224851 A1 | 9/2012 | Takara et al. | |
| 2016/0099851 A1* | 4/2016 | Archambault | H04J 14/0212 398/16 |

FOREIGN PATENT DOCUMENTS

| | | |
|---|---|---|
| JP | 2009-212584 A | 9/2009 |
| JP | 2010-098545 A | 4/2010 |
| JP | 2011-101216 A | 5/2011 |
| WO | WO 2009/145118 A1 | 3/2009 |
| WO | WO 2009/060522 A1 | 5/2009 |
| WO | WO 2011/030897 A1 | 3/2011 |

OTHER PUBLICATIONS

Japanese Office Action dated Sep. 9, 2015 with partial English translation.

* cited by examiner

OPTICAL COMMUNICATION APPARATUS, OPTICAL COMMUNICATION SYSTEM, AND PATH CONTROL METHOD

This application is based upon and claims the benefit of priority from Japanese patent application No. 2011-208166, filed on Sep. 22, 2011, the disclosure of which is incorporated herein in its entirety by reference.

BACKGROUND

The present invention relates to photonic network technology, and more particularly to an optical communication apparatus, an optical communication system, and a path control method for switching paths between nodes.

In recent years, various technologies relating to a photonic network have been developed.

For example, Patent Literature 1, Patent Literature 2, and Non-Patent Literature 1 disclose some photonic network technology.

Patent Literature 1 discloses a drop circuit and an add circuit used in a reconfigurable optical add/drop multiplexer (ROADM device). Furthermore, Patent Literature 1 describes a colorless function using a wavelength selective switch (WSS). Patent Literature 1 also describes a direction function of switching paths to a different path with use of a wavelength cross connect device (WXC).

Similarly, Patent Literature 2 discloses a colorless function, a direction function, a wavelength cross connect device, a wavelength selective switch, and the like.

Furthermore, high-speed communication for 40 Gb/s or 100 Gb/s has been available in a digital optical transmission technology by using a phase modulating technique and a coherent receiving technique. For example, Non-Patent Literature 1 discloses such related technology.

For example, it is assumed that four nodes (Nd=4) are connected using ROADM devices having no colorless function or directionless function as shown in FIG. 16.

In this network, a path of a channel λ1 currently connected is to be switched into a different path (ROADM1→>ROADM4→ROADM3) using a channel λ2 (see FIG. 17).

In this case, there are required operations of preparing a new transponder TPND1-2 on ROADM1 of FIG. 17, opening a path of λ2, and finally changing a client. This is because the wavelength that can be transmitted to a connection port of a transponder is fixed if a ROADM device has no colorless function.

Even a ROADM device that copes with a colorless function needs to be connected to an add/drop part connected to a different path if it does not cope with a directionless function.

In order to switch optical transmission paths and channels (i.e., light wavelengths) of an optical communication apparatus that does not cope with a colorless function, an operator needs to go to an instillation site of a node and to directly rearrange an optical fiber into a connection terminal for a wavelength to be switched. This is because a remote operation cannot be performed since the channel of a ROADM device is fixed for a connection terminal of a transponder. At that time, an alternative transponder should be prepared in some cases. Such an operation arises problems requiring various costs such as cost of sending an operator, employment cost, facility cost, and cost of making a work planning. Furthermore, the downtime becomes longer along with a period of time required for such an operation. Thus, various problems will arise.

Even a ROADM device that copes with a colorless function suffers from signal interruption during a switching period of the ROADM device. In other words, primary signals cannot be transmitted during an operation of switching paths of a ROADM device (signal interruption period). Thus, transmission efficiency is problematically lowered.

When paths are to be switched, channels change from a current one in some cases where, for example, signals using the same channel (wavelength) have already been transmitted on a new path. In such cases, a new path should be ensured by changing not only transmission paths, but also channels.

In the field relating to the present invention, it has been desired to be capable of coping with various functions that will be provided in the near future. For example, the amount of communication data flowing through optical networks may greatly vary in a day or several hours depending upon a variety of social activities (sports or musical events, incidents, accidents, and the like). As a countermeasure for such variations, therefore, operations of switching paths in an optical communication apparatus may be performed per day or a shorter period.

Patent Literature 1: JP-A 2010-098545
Patent Literature 2: JP-A 2009-212584
Non-Patent Literature 1: Thesis "Performance of Dual-Polarization QPSK for Optical transport systems," Kim Roberts, Maurice O'Sullivan, Kuang-Tsan Wu, Han Sun, Ahmed Awadalla, David J. Krause, and Charles Laperle, Journal of Lightwave technology, vol. 27. No. 6, 2009

SUMMARY OF THE INVENTION

The present invention provides an optical communication apparatus, an optical communication system, and a path control method capable of improving at least one of the aforementioned problems.

According to one aspect of the present invention, there is provided an optical communication apparatus having a transponder having a double-wavelength tunable transceiver and a transceiver including a switching controller, and a ROADM device having a device that copes with a colorless function and a directionless function and can operate in cooperation with the transponder.

Furthermore, when node devices including the aforementioned optical communication apparatus operate in cooperation with each other in a network having at least two different paths being connected, path switching can be conducted with short signal interruption or without instantaneous interruption by remote control.

DETAILED DESCRIPTION OF THE PREFERRED EMBODIMENTS

Embodiments of the present invention will be described in detail with reference to FIGS. 1 to 17. Explanation of parts that do not directly relate to the present invention will be omitted or simplified.

Figure 1:
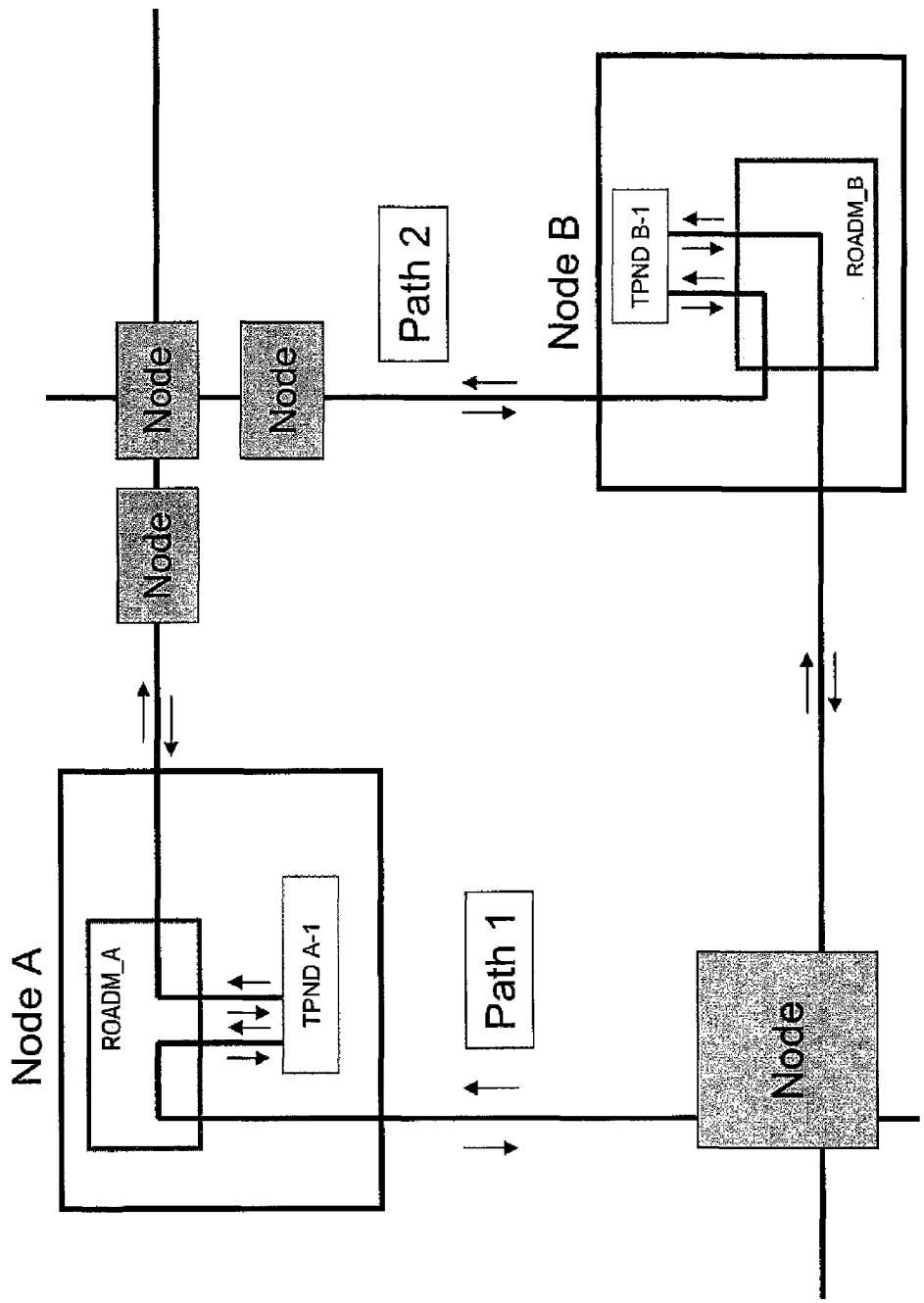
FIG. 1 is a block diagram showing an example of a configuration of a network including a node device according to the present invention.

FIG. 1 shows a configuration example of a network including node devices according to an embodiment of the present invention. In FIG. 1, a node A and a node B are connected to each other via at least two paths by optical fibers. A node device of each of the nodes includes a transponder (e.g., TPNDA-1 or TPNDB-1) and a reconfigurable optical add/drop multiplexer (e.g., ROADM_A or ROADM_B) according to the present invention. The transponder includes a transceiver having a function of switching connections without instantaneous interruption by simultaneously using two channels (wavelengths). The reconfigurable optical add/drop multiplexer has colorless and directionless functions or colorless, directionless, and contentionless functions. The reconfigurable optical add/drop multiplexer can operate in cooperation with the transponder. FIG. 1 illustrates a case where the number of connection paths of each of the nodes is four. Nodes are illustrated as being connected to each other by one line in FIG. 1. However, one line in FIG. 1 represents two lines because two lines are usually used for two communication directions of an optical fiber. In a case where two-way communication is performed with a single line, only one line is used. The transponders (TPND) and the reconfigurable optical add/drop multiplexers (ROADM) included in the nodes A and B form wavelength division multiplexing devices.

Figure 2:
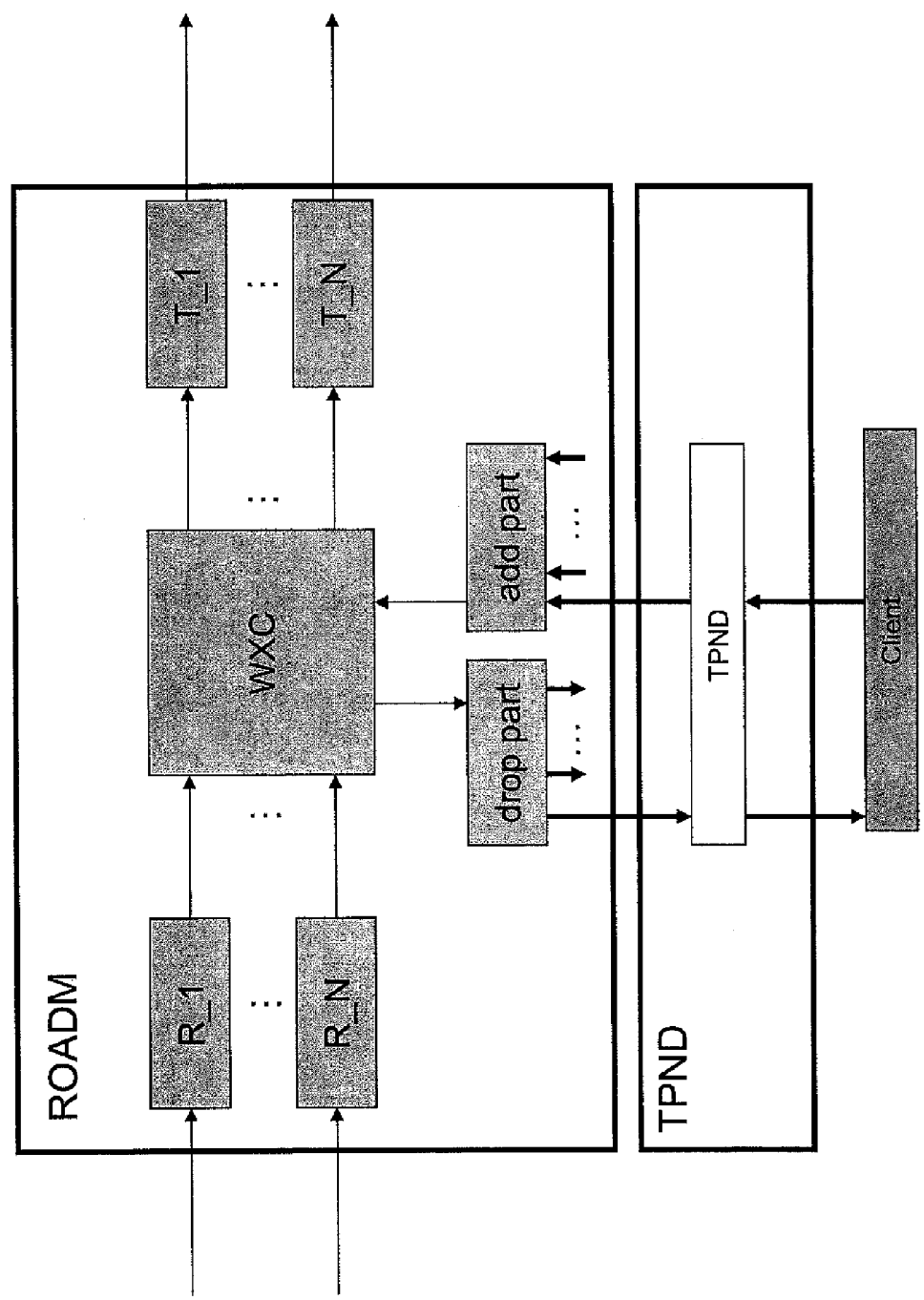
FIG. 2 is a block diagram showing an example of a configuration of a ROADM device and a transponder (TPND) included in a node device shown in FIG. 1.

A configuration of a ROADM device according to the present invention as shown in FIG. 1 will be described below with reference to FIG. 2.

In a case where the number of paths is Nd (Nd is an integer larger than one), a ROADM device includes receiver modules R_1 to R_N and transmitter modules T_1 to T_N that can be connected to transmission lines, a wavelength cross connect (WXC) module that can exchange optical signals between the receiver modules and the transmitter modules, and an add part and a drop part that receive signals from and transmit signals to the WXC module and receive signals from and transmit signals to a local transponder (TPND). The WXC module is formed by a wavelength selective switch (WSS) or the like.

It is assumed that Ntp transponders can be connected to the illustrated add part and drop part. If the number of channels used in this system is Nch, the maximum of Ntp is Nd×Nch. A ratio of the number of connection ports (Ntp) actually prepared to the maximum of Ntp is referred to as a signal to add-drop ratio.

Add-drop ratio (%)=100×(the number of transponders prepared in a ROADM device $(Ntp)$)/$(Nd \times Nch)$ The add-drop ratio should be 100%. Nevertheless, it will be difficult to ensure 100% from the viewpoints of cost and size if the number of channels or paths increases. Therefore, a low-cost design can readily be achieved by reducing the ratio to about 50%.

Figure 3:
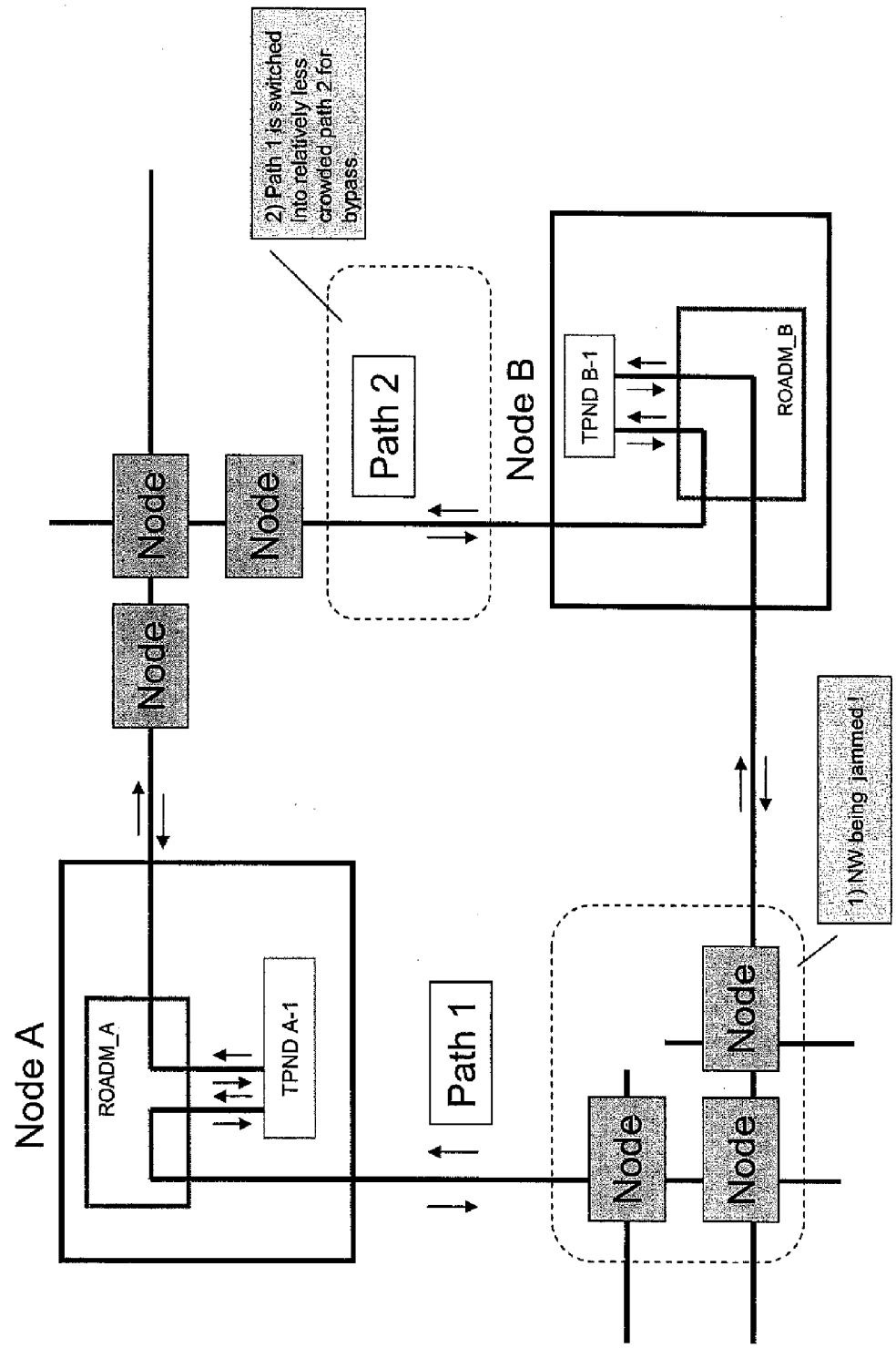
FIG. 3 is a block diagram showing an example of a configuration of a network to which node devices according to the present invention are connected.

A network may be configured using the illustrated ROADM devices as shown in FIG. 3, which illustrates a connection example where Nd=2. In this case, node devices are connected to each other by at least two paths.

Figure 4:
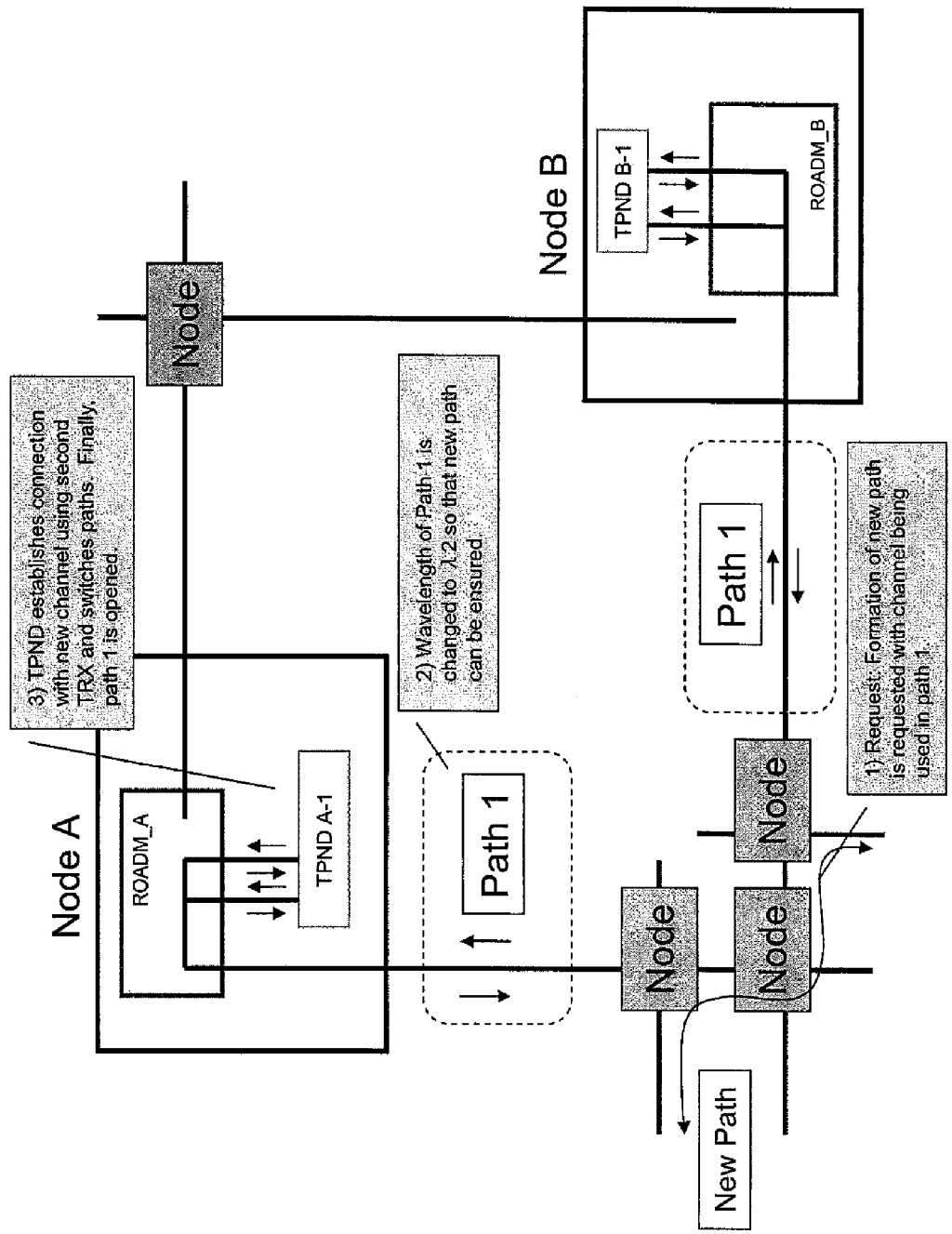
FIG. 4 is a block diagram showing another example of a configuration of a network to which node devices according to the present invention are connected.

Referring to FIG. 4, there is illustrated a network using ROADM devices in a case where Nd=4. In this case, node devices are also connected to each other by at least two paths.

Figure 5:
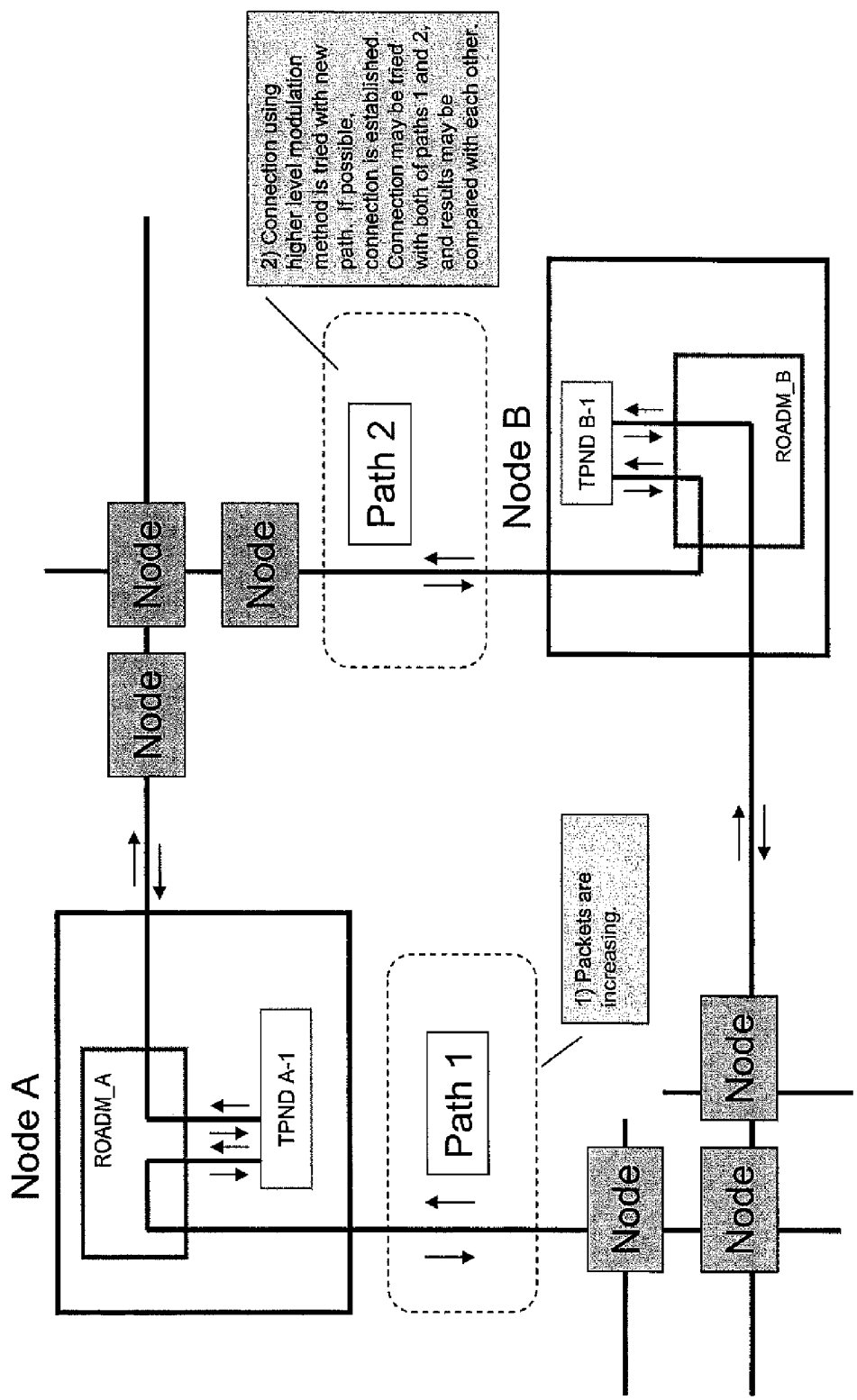
FIG. 5 is a block diagram showing still another example of a configuration of a network to which node devices according to the present invention are connected.

Referring to FIG. 5, there is illustrated a network using ROADM devices in a case of a combination of a node A and a node B having different numbers of paths (Nd). In this case, node devices are also connected to each other by at least two paths.

As shown in FIGS. 3 to 5, a ROADM device according to the present invention is applicable to various optical networks connected by at least two paths.

Figure 6:
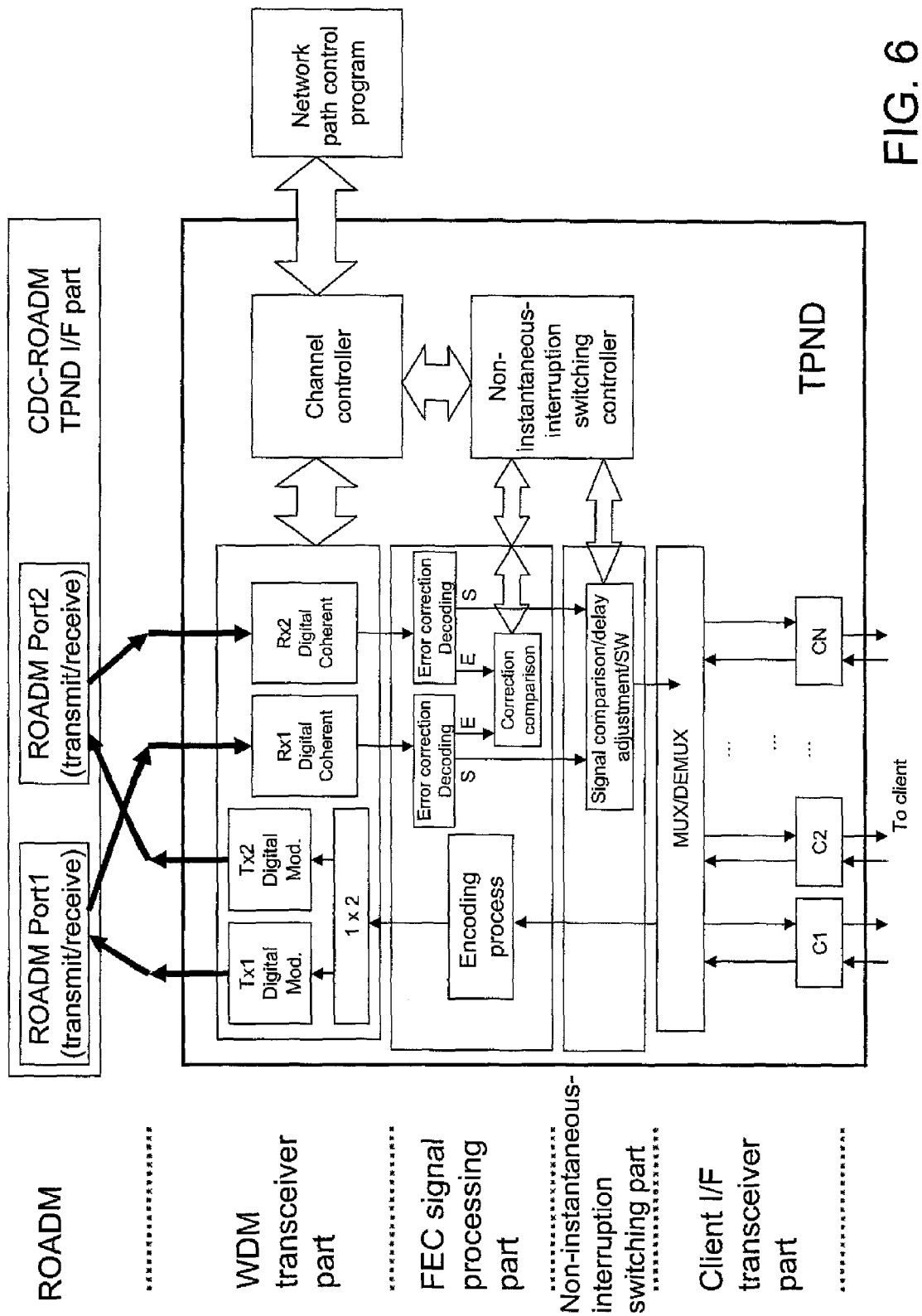
FIG. 6 is a block diagram explanatory of a configuration of a transponder (TPND).
Figure 9:
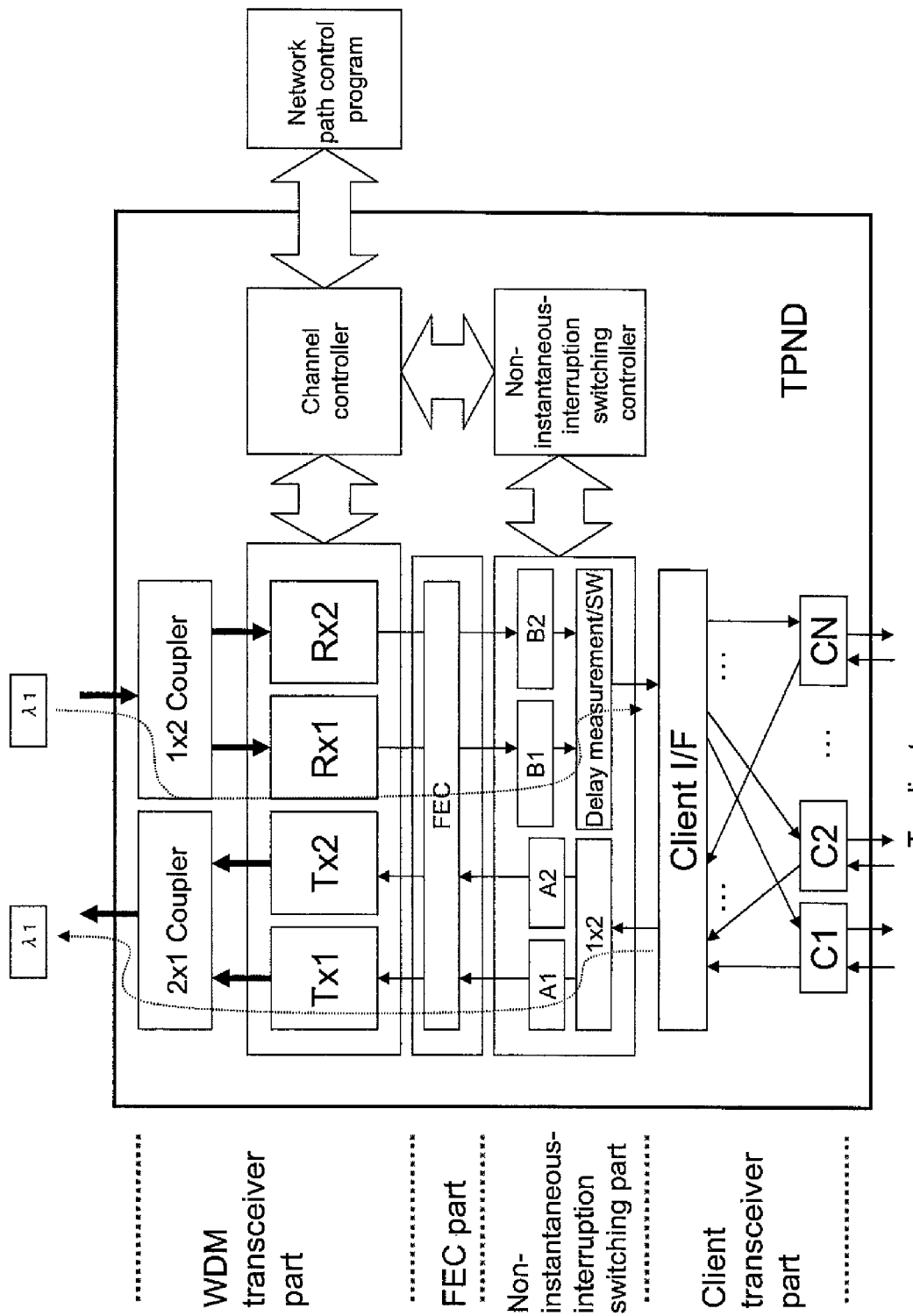
FIG. 9 is a block diagram explanatory of an operating state of a transponder (TPND).
Figure 12:
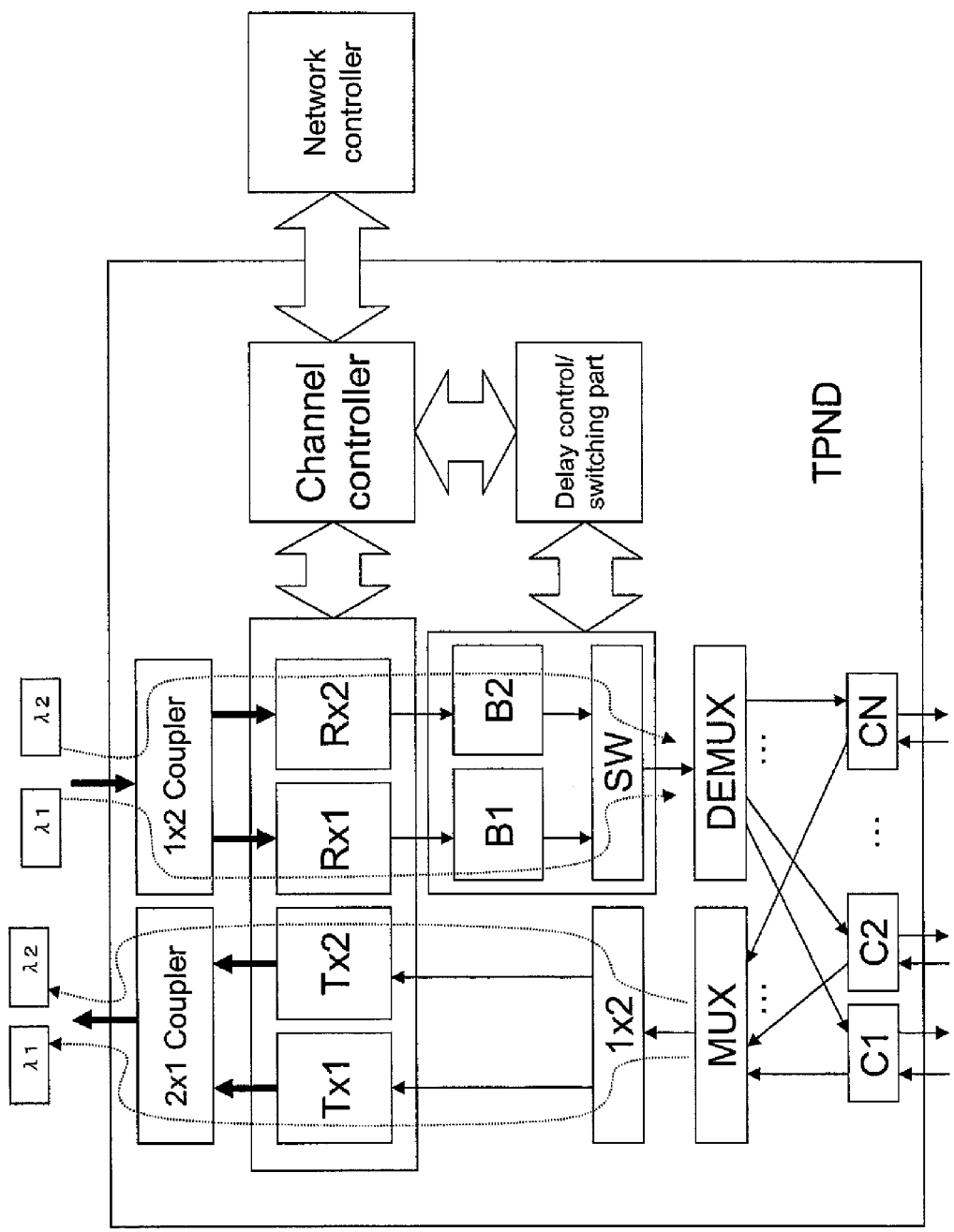
FIG. 12 is a block diagram explanatory of an operating state of a transponder (TPND) in a node device.

An example of a configuration of a transponder (TPND) according to an embodiment of the present invention will be described with reference to FIG. 6. As shown in FIG. 6, the transponder (TPND) connected to a ROADM device has a WDM transceiver part, an FEC signal processing part, a non-instantaneous-interruption switching part, and a client I/F transceiver part. The transponder may be configured as shown in FIG. 9 or 12.

The illustrated WDM transceiver part has transmitters (Tx1, Tx2) with duplex channels based upon tunable laser technology.

The WDM transceiver part has digital coherent receivers (Rx1, Rx2) with duplex channels. With this configuration, signals having two different wavelengths can be received concurrently, and electric signals can be outputted.

The FEC signal processing part is connected to the transmitters and the receivers of the WDM transceiver part. Since signals are duplexed, lines are also duplexed. The FEC signal processing part operates as an error correction part.

The non-instantaneous-interruption switching part is disposed between the FEC signal processing part and the client I/F transceiver part. The non-instantaneous-interruption switching part has a transmitting part for performing a signal multiplex (MUX), a receiving part for performing a signal demultiplex (DEMUX), and a part for performing signal comparison, delay adjustment, and SW operation. Data for phase detection are inputted to the part for performing signal comparison, delay adjustment, and SW operation. The received data are stored in a memory so that the amount of delay can be adjusted.

Then the data for phase detection are detected by a delay measurement part, so that a phase shift is controlled. Thus, a phase shift of a signal can be prevented. Furthermore, channels can be switched by using an external signal as a trigger.

An output signal from the part for performing signal comparison, delay adjustment, and SW operation is inputted to one or more client interfaces via the client I/F transceiver part.

Furthermore, the illustrated transponder (TPND) has a channel controller connected to a network path control part and a non-instantaneous-interruption switching controller. The network path control part controls the channel controller in accordance with a predetermined program.

Operations of the network illustrated in FIG. 1 will be described below with reference to FIGS. 7 to 9.

(Initial State: Connection with $\lambda 1$)

Figure 7:
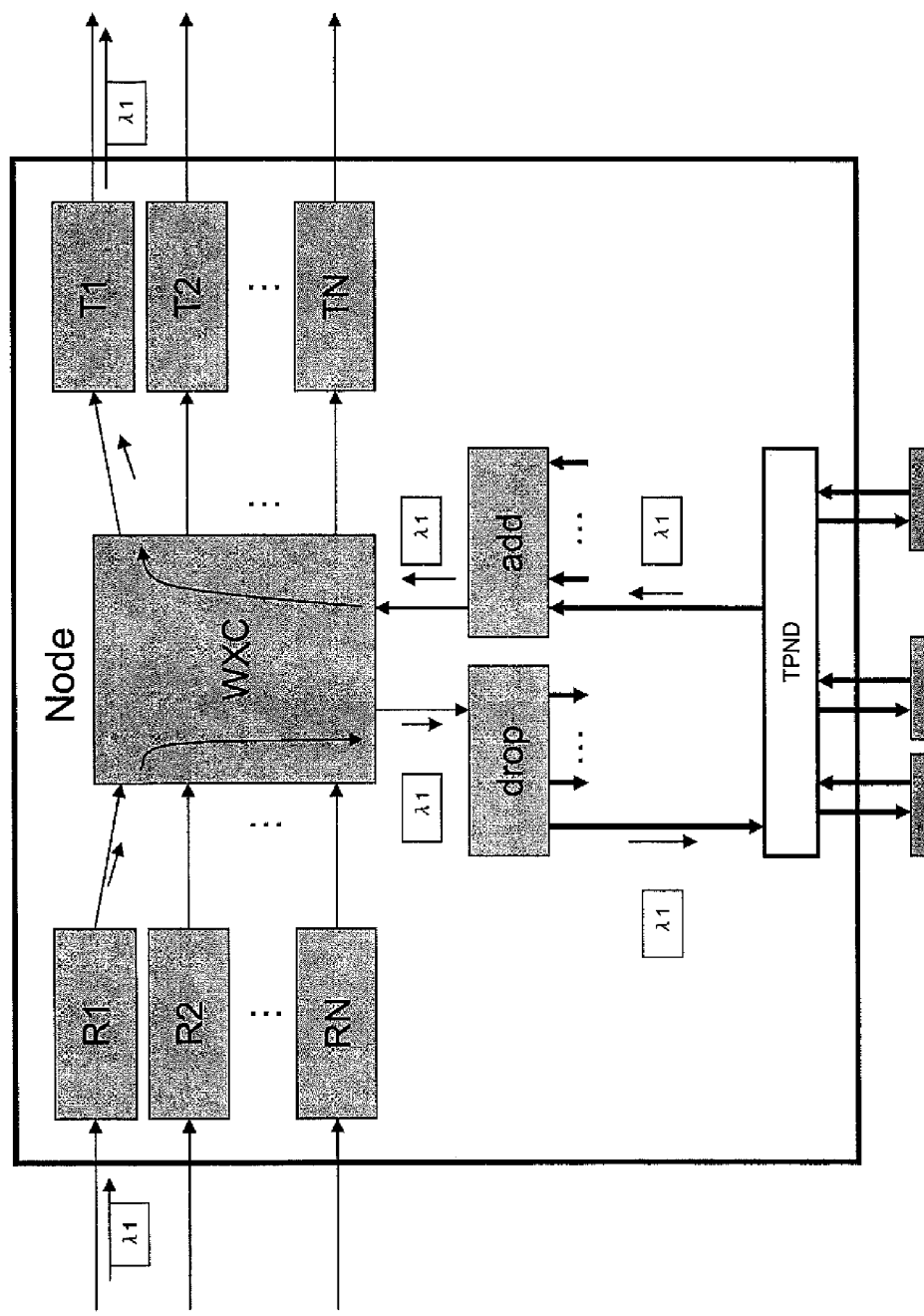
FIG. 7 is a block diagram explanatory of an initial state of a node.

As shown in FIG. 7, data inputted from clients are supplied to the transponder (TPND) shown in FIG. 6, multiplexed therein, and then inputted to the transmitter Tx1 of the WDM transceiver part. The transmitter Tx1 carries the data on a signal of a channel $\lambda 1$. The data are inputted to the add part of ROADM1 and outputted to the transmission line from T1.

Figure 8:
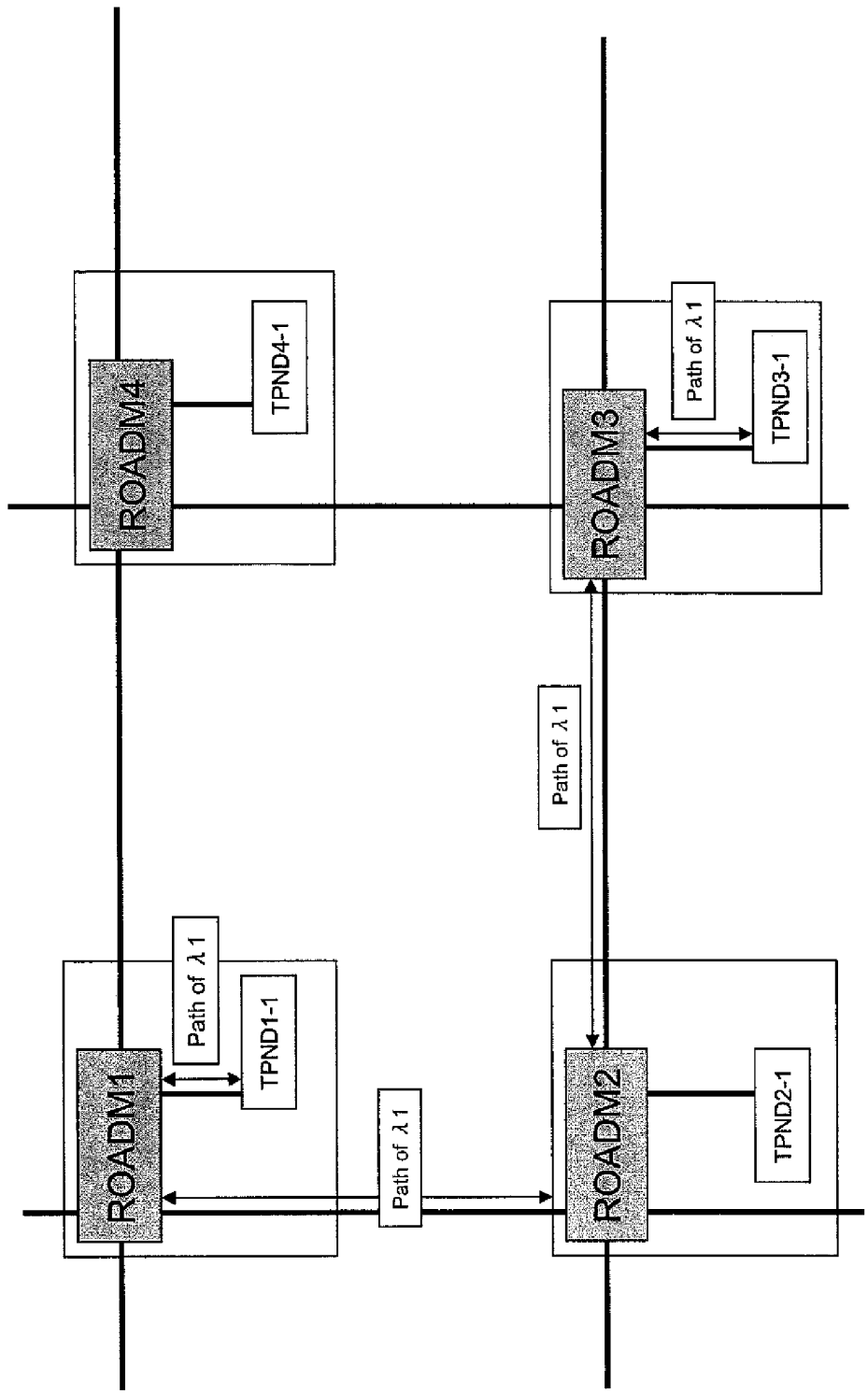
FIG. 8 is a block diagram explanatory of operations between nodes in the state shown in FIG. 7.

Referring to FIG. 8, the signal from ROADM1 is transmitted to ROADM2 and ROADM3 in the network and thus transmitted to TPND3-1.

As shown in FIG. 7, ROADM3 receives the signal of $\lambda 1$ from ROADM1 at R1. The WXC part outputs the signal to the drop part, which outputs the signal to the transponder (TPND).

As shown in FIG. 6, the transponder part (TPND) performs a delay adjustment on the signal received at RX1, then selects the signal with SW, and inputs the signal to the client I/F transceiver part, to which client transmitters are connected.

Figure 10:
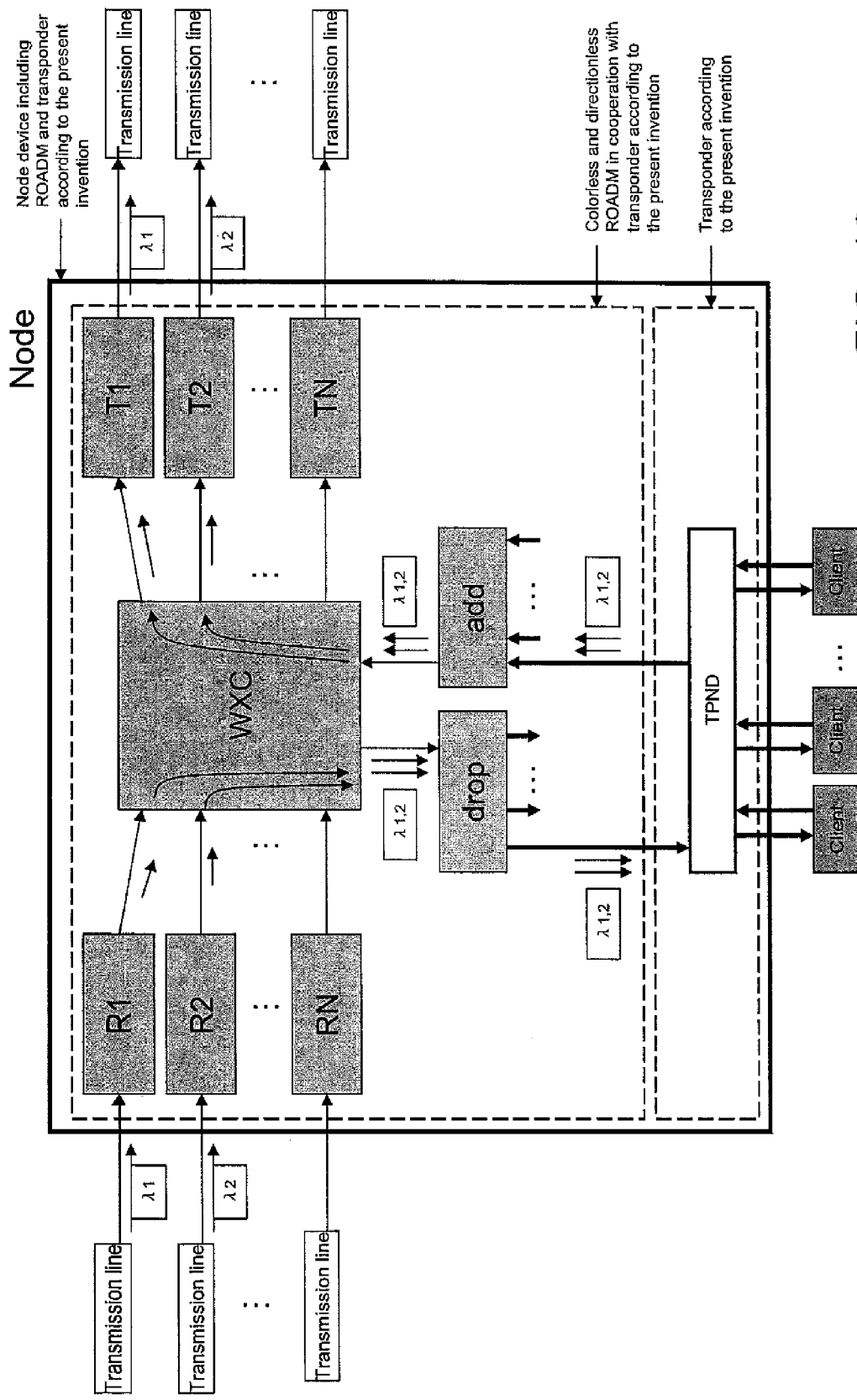
FIG. 10 is a block diagram explanatory of another operating state of a node device according to the present invention.

Similarly, a signal in a reverse direction is inputted from a client signal terminal of the transponder (TPND) and outputted to a ROADM device through the client I/F transceiver part, the non-instantaneous-interruption switching part, the FEC part, TX1, and a 2×1 coupler as shown in FIG. 9. As shown in FIG. 10, the ROADM device outputs the signal to the transmission line through the add part, WXC, and T1. In FIG. 9, the 2×1 coupler is a couple with two inputs and one output.

Furthermore, as shown in FIG. 8, the aforementioned signal in the reverse direction is outputted from ROAMD3 to ROADM1 through the transmission line, ROADM2, and the transmission line. As shown in FIG. 10, ROADM1 outputs the signal to the transponder (TPND) through R1, WXC, and the drop part.

As shown in FIG. 9, the transponder (TPND) is connected to a client with a path extending through a 1×2 coupler, RX1, the FEC part, the non-instantaneous-interruption switching part, and the client transceiver part. In FIG. 9, the 1×2 coupler is a couple with one input and two outputs.

(Transition State)

A node according to an embodiment of the present invention can change paths or channels of optical signals without instantaneous interruption or only with considerably short interruption. Therefore, the node performs a double connection to the same receiver with a channel of $\lambda 2$, equalizes delays on the receiving side, conducts switching with an electric switch, and deletes the path of $\lambda 1$ after successful switching.

(1) Connection with $\lambda 2$

Figure 11:
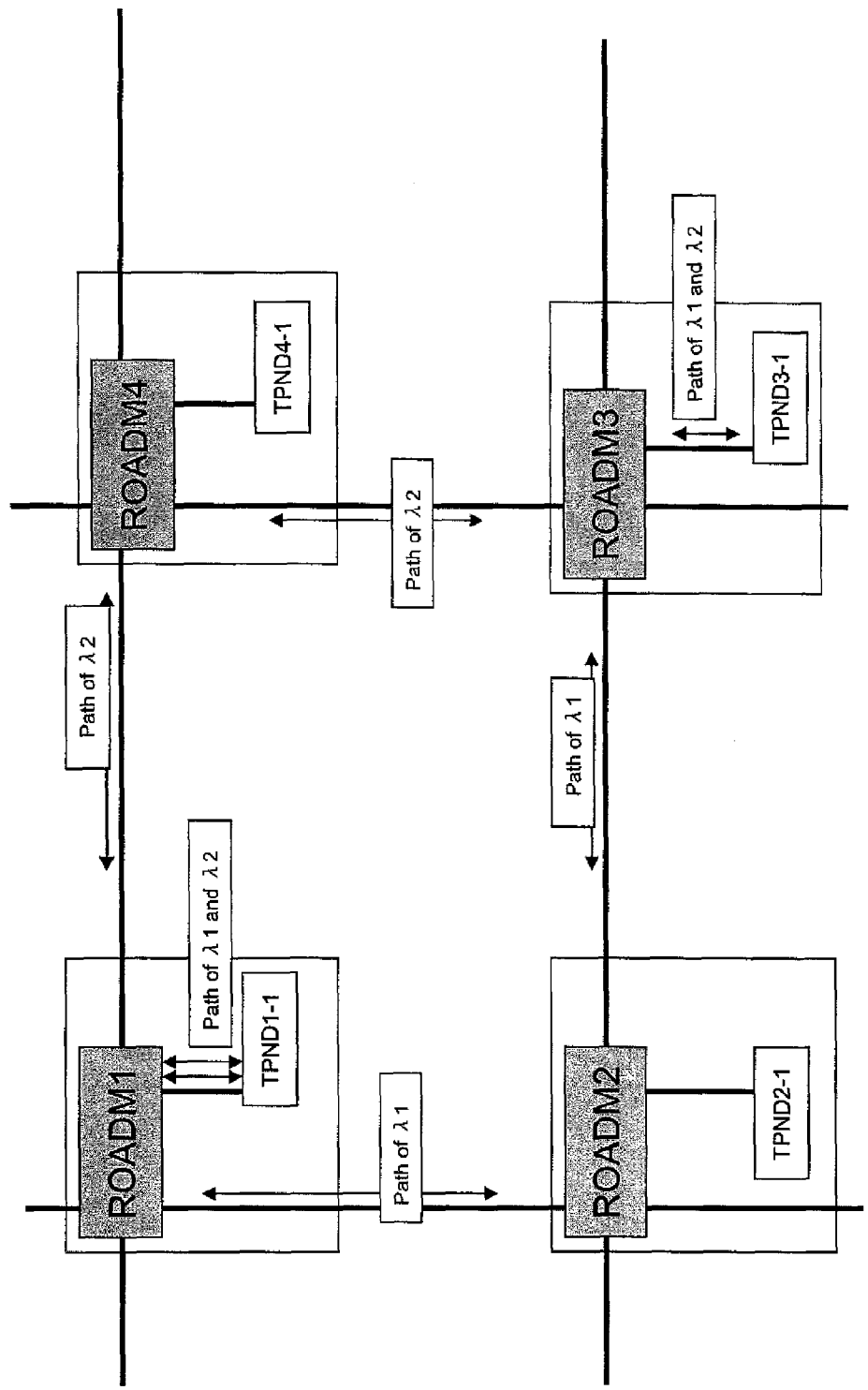
FIG. 11 is a block diagram explanatory of operations between nodes in a transition state.

As shown in FIG. 11, a new path of $\lambda 2$ is to be opened in the network. The transponder (TPND) turns a transmission output of TX2 shown in FIG. 12 on. Then the signal at TX2 is inputted to the add part through the same path in the ROADM device as that for $\lambda 1$, which has been described in connection with FIG. 10. Then the WXC part outputs the signal to T2.

Since this ROADM device copes with a colorless function, simultaneous connection to the add part can be established with different wavelengths. Furthermore, since this ROADM device copes with a directionless function, the add part can establish connection in any desired transmission direction (path).

The signal outputted to the transmission line from ROADM3 is transmitted to ROADM1 through ROADM4 as shown in FIG. 11.

As shown in FIG. 10, ROADM1 receives a signal from ROADM4 at R2. The WXC part connects the drop part. Then the signal is inputted to the transponder (TPND) through the same path as that for $\lambda 1$.

Since a ROADM device according to the present invention copes with a colorless function, a signal of $\lambda 1$ and a signal of $\lambda 2$ can be transmitted to the transponder (TPND) with the same path.

As shown in FIG. 12, the transponder (TPND) outputs a signal of $\lambda 2$ to the switch (SW) through the 1×2 coupler, RX2, and B2. At that time, the switch still selects B1, so that signals from B2 are discarded.

(2) Switching without Instantaneous Interruption or with Short Interruption

When a signal of $\lambda 2$ is connected, the delay control/switching part illustrated in FIG. 12 operates delays of B1 and B2 so as to equalize the delays of signals of two channels ($\lambda 1$, $\lambda 2$). After the delays are equalized, the paths are switched at a high speed by the switch. This operation allows the path to be switched into a path of $\lambda 2$ without instantaneous interruption.

The non-instantaneous-interruption switching part adds a delay identification signal on the transmitting side. The non-instantaneous-interruption switching part detects and removes the delay identification signal on the receiving side.

Switching without instantaneous interruption can be achieved by controlling delays between two channels based upon measured delays and equalizing those delays before the switching.

Even if the delays cannot be equalized, the loss of signals can be minimized by adjusting the delays as much as possible.

Even if a difference of the path length of two signals is as long as about 200 km, a difference of the delay is about 1 ms. Even if a difference of the path length of two signals is as long as about 1,000 km, a difference of the delay is about 5 ms.

Thus, even if delays cannot be equalized, a period of time of signal interruption is as short as about 5 ms.

Signal interruption occurs only when paths are switched from a path having shorter delay to a path having longer delay. Such short signal interruption enables very-high-speed path switching as compared to a path switching time of a ROADM device (0.1 second to 10 seconds).

The path switching time of a ROADM device depends upon a switching speed of devices including the add part, the transmission path, and the drop part.

In most cases, a wavelength selective switch (WSS) on a path has a switching time on the order of 0.1 second to 10 seconds.

Furthermore, a period of time for transmitting a switching command to a WSS needs to be added. Therefore, when the entire network is considered, a path switching time requires a period on the order of 0.1 second to 10 seconds.
(Termination State)

Only the new path of λ2 is occupied for communication.

Figure 13:
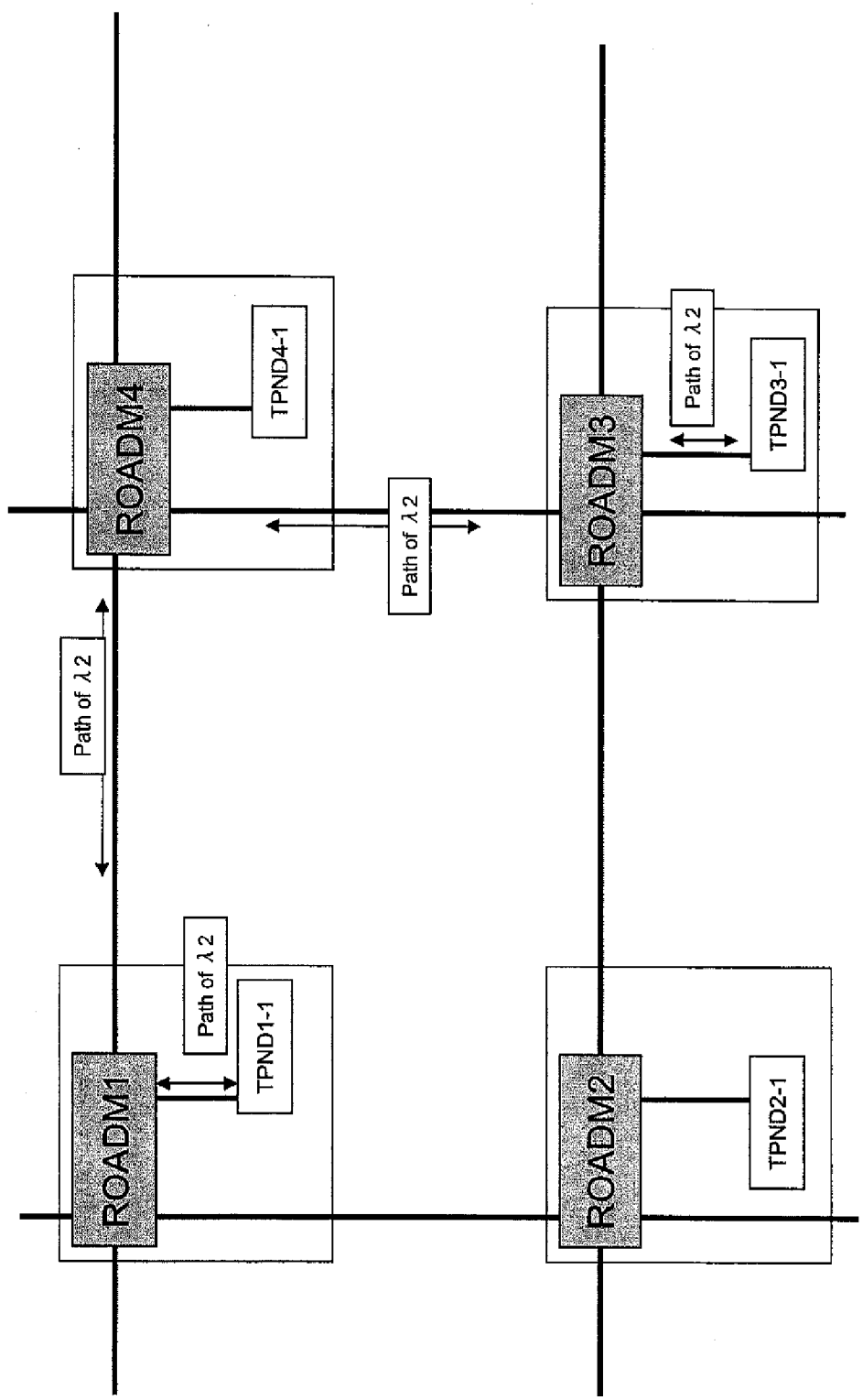
FIG. 13 is a block diagram explanatory of operations between nodes in another state.

As shown in FIG. 13, a signal of λ2 outputted from ROADM1 is transmitted to ROADM4 and ROADM3 via the new path using λ2 in the network.

Figure 14:
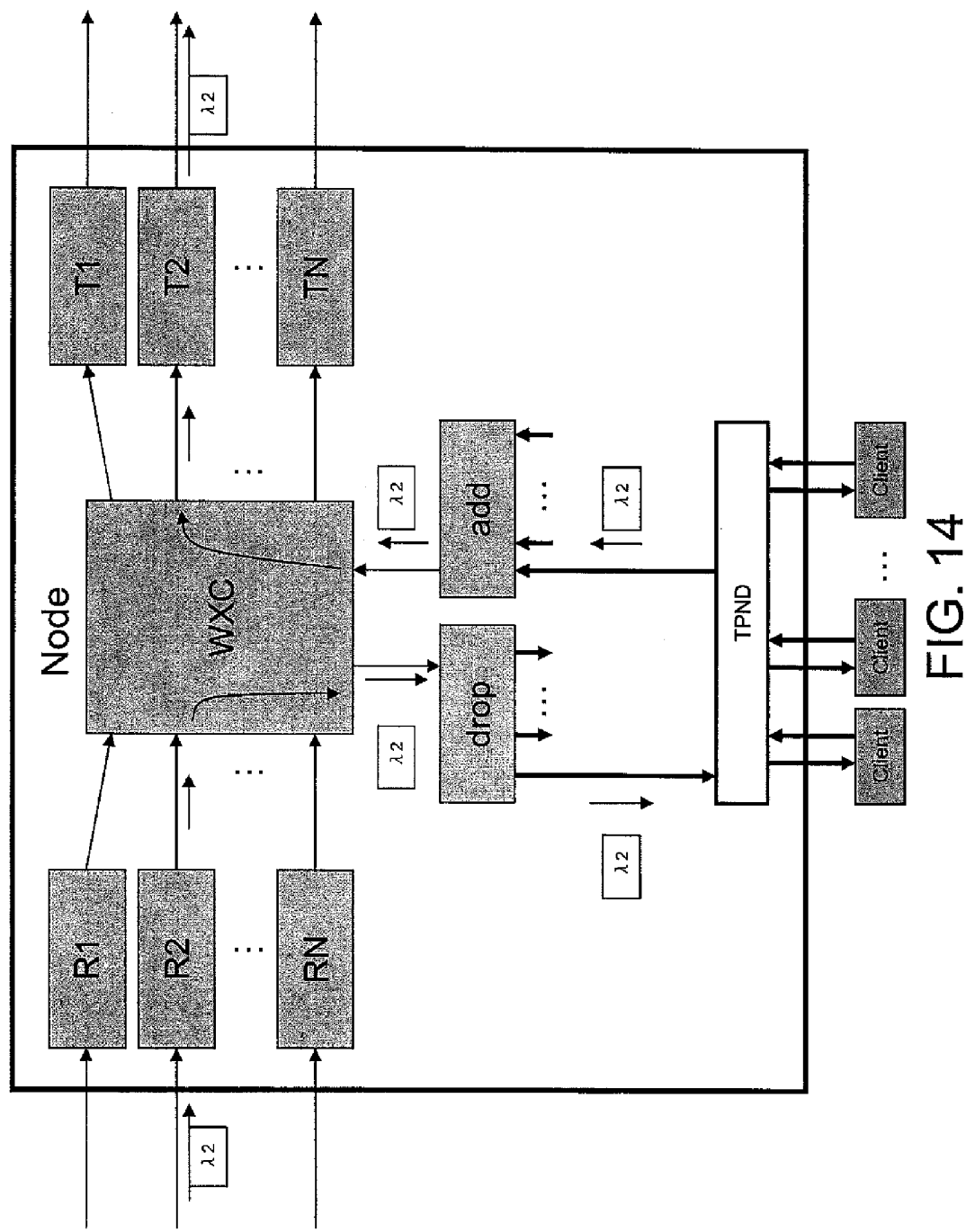
FIG. 14 is a diagram explanatory of an operation of an optical communication apparatus in a node device.

As shown in FIG. 14, ROADM3 receives the signal at R2 (to which the new path has been connected), and the signal is transmitted to TPND via the WXC part and the drop part.

The transmitting side transmits the signal received from TPND to T2 (a transmission part for the new path) via the add part and the WXC part. Then the signal is transmitted to the transmission line.

Figure 15:
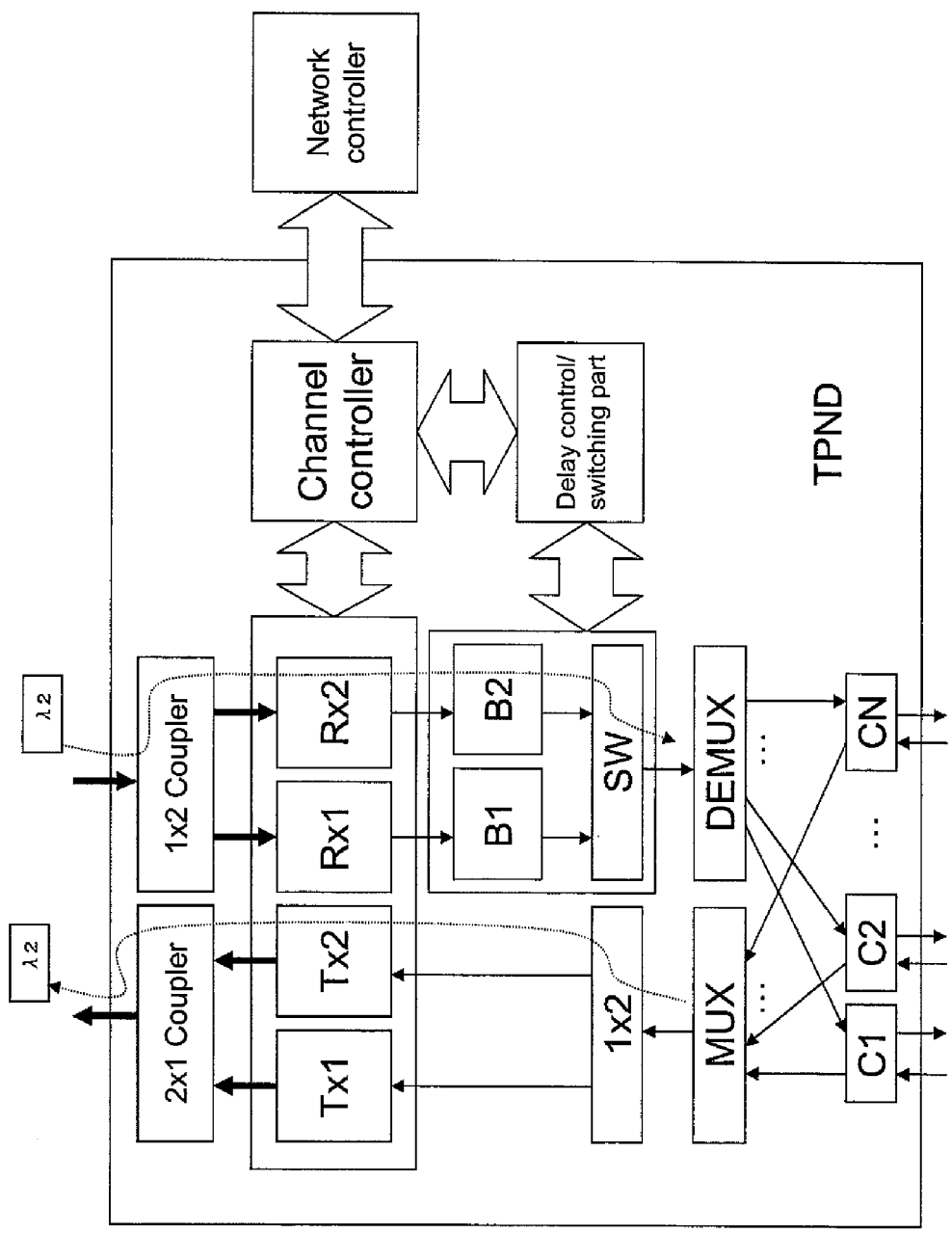
FIG. 15 is a block diagram explanatory of an operating state of a transponder (TPND) in a node device.
Figure 16:
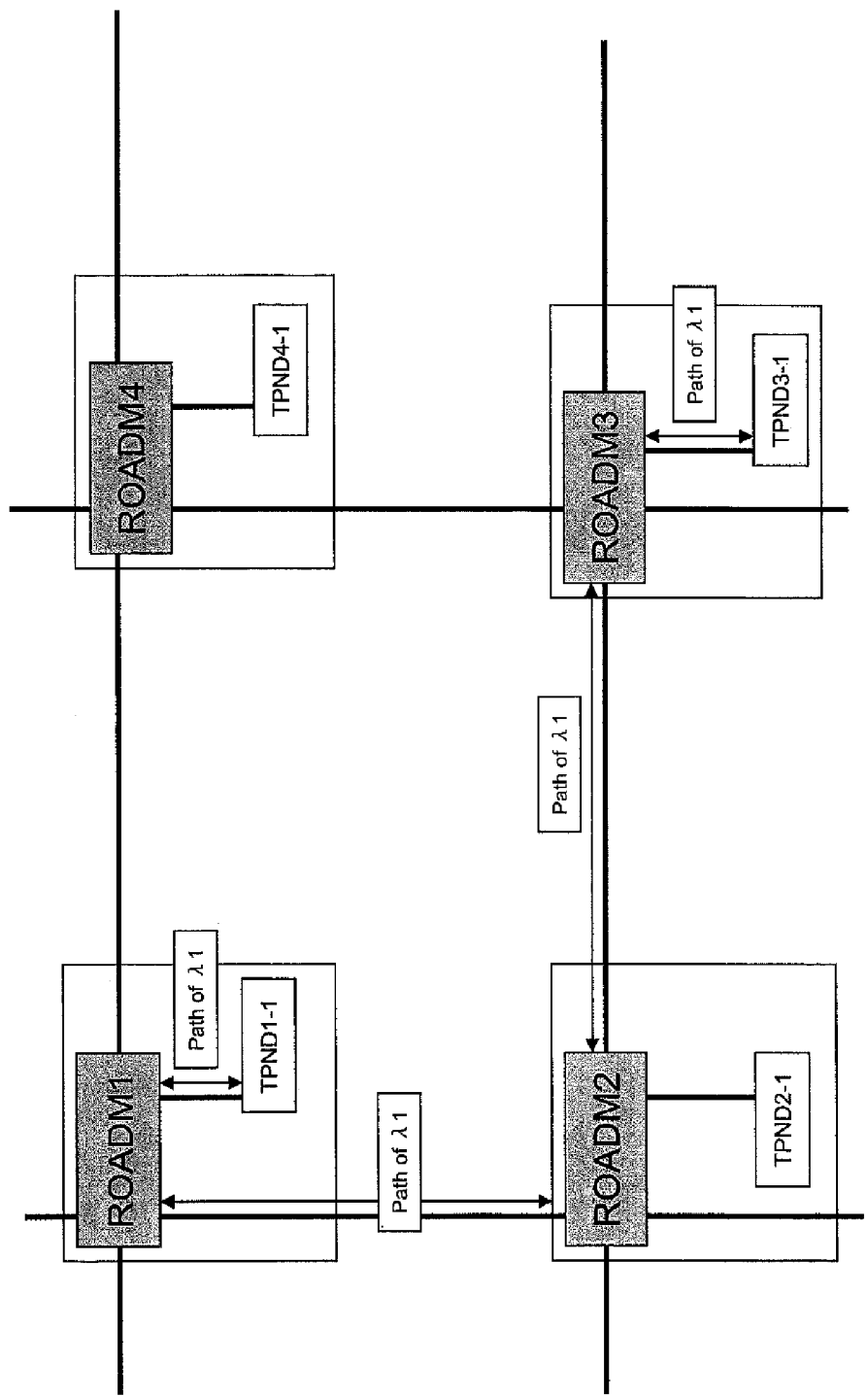
FIG. 16 is a diagram explanatory of operations between nodes in related art.
Figure 17:
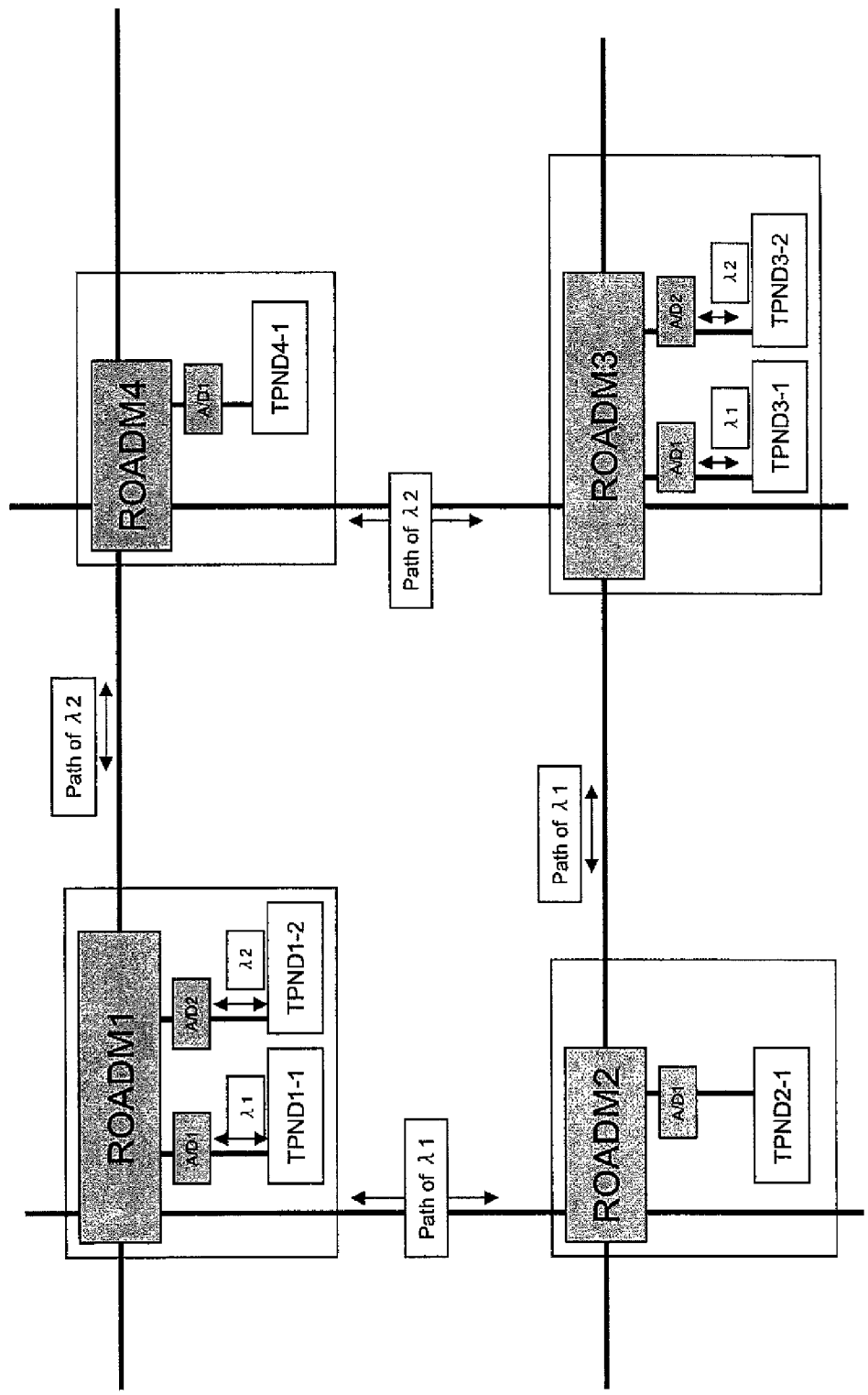
FIG. 17 is a diagram explanatory of a switching operation in related art.

As shown in FIG. 15, TPND transmits the signal to the client via the 1×2 coupler, Rλ2, B2, SW, and the client transceiver part.

In the transmitting part of TPND, the signal outputted from MUX is transmitted to the ROADM device via the 1×2 coupler, TX2, and the 2×1 coupler as shown in FIG. 15.

The following advantageous effects can be obtained by using a WDM transmission device according to the present invention.

For path switching of switching transmission paths and transmission channels, disconnection time corresponding to a switching period of a ROADM device can be eliminated. Thus, the speed of path switching can be increased up to a speed that is limited by an electric switching speed.

Delays between paths can be corrected. Path switching can be initiated at any desired timing if path switching can be conducted without instantaneous interruption.

For path switching including changing transmission paths and channels, it is not necessary to manually rearrange a fiber. Employment cost and work planning cost required for fiber rearrangement can be reduced, and a period of time for such an operation can be shortened.

Since paths and channels can be changed by a remote operation, it is possible to cooperate with a program that calculates the priority of paths and controls changing of paths based upon the priority of paths in order to optimize transmission paths. Thus, when one path is deleted or changed, the existing other communication paths can automatically be reconnected with optimal paths.

Some features of the present invention will be added below.

A WDM transmission device according to an embodiment of the present invention has a CDC-ROADM and a transponder (TPND).

The ROADM device has a colorless function and a directionless function.

Meanwhile, the transponder is configured to include a client I/F transceiver part, a non-instantaneous-interruption switching part, an FEC part, and a WDM transceiver part. Furthermore, the transponder has a controller operable to manage respective components in a centralized manner.

The client I/F transceiver part receives signals transmitted from a plurality of clients being connected, multiplexes them into one signal, and delivers the signal to WDM. The client I/F transceiver part receives multiplexed signals from WDM and divides them into a plurality of client signals.

The non-instantaneous-interruption switching part is configured to compare inputted signals of multiple systems (two systems in the drawings) with each other, adjust one or both of delays of those signals, and switch the signals without instantaneous interruption.

The switching is conducted under the direction of a non-instantaneous-interruption controller. Upon inputting and switching of the same signals, the existing system may autonomously be switched into a posterior system while a delay that does not cause a loss of data is used as a key.

The FEC part (forward error correction part) is configured to have a function of performing an encoding process for WDM signals on multiplexed client signals and a function of decoding encoded signals received from WDM. Furthermore, the FEC part includes a correction comparison part operable to perform a decoding process on each of the systems upon signal decoding, to obtain the amount of correction for each of the systems, and to determine the quality of communication of each of the received systems from the obtained amount of correction. With this correction comparison part, the quality of transmission of the systems can be confirmed beforehand. As a result, appropriate system switching can be achieved.

The WDM transceiver part includes digital optical transmitter parts operable to transmit WDM signals generated in the FEC part to at least two fibers with desired channels (i.e., wavelengths) and digital optical receiver parts corresponding to the digital optical transmitters.

Furthermore, the digital receivers cope with multiple types of multi-level phase modulation methods such as DPSK, QPSK, and 8PSK. The digital receivers are configured to change modulation methods for transmission in response to commands from a network path controller.

The transponder has a channel controller and a non-instantaneous-interruption switching controller mounted thereon as control parts. The channel controller controls modulation methods or wavelengths of transmitting/receiving channels. The non-instantaneous-interruption switching controller manages selection of a signal system to be transmitted to a client from among a plurality of systems of received WDM signals.

The control part is configured to control respective components of the transponder in response to commands from the network path controller, to constitute an optical network with a specified channel or the like, and to provide notification of the results.

An input and an output of the WDM transceiver part are respectively paired so that two connection terminals of the transponder are used. More input/output systems may be provided so as to provide an N+1 configuration.

Such a transponder is connected to a ROADM device having a colorless function, a directionless function, and a contentionless function in a network as shown in FIG. 1.

By using the transponders (TPND) (e.g., A-1 and B-1) according to the present invention, the path 2 may be connected physically so that no manual operations of connecting fibers will be required later in a case where the node A and the node B are connected via the path 1. Thus, the paths can be switched.

When the node connecting via the path 1 is jammed by other signal connections, path changes, and the like, then the signal route connecting the transponders A-1 and B-1 to each other can be changed so as to level out rates of operation of the networks.

First, a digital optical transceiver for the path 2 is initiated, and setting for opening the path 2 is conducted on the network via a ROADM device.

Each of the transponders (TPND) evaluates an error correction and a delay of the path 2 and determines whether or not switching can be conducted. If an error correction and a delay at a specified point of time are not more than predetermined values, the transponder determines that switching can be conducted, then equalizes the delays, and conducts path switching.

When the switching succeeds, the path 1 is opened.

Thus, a jammed node can ensure a new path.

By using the transponders (TPND) A-1 and B-1 according to the present invention, channels can be switched in a state in which the node A and the node B are connected to each other with the path 1 at the channel 1.

Specifically, it is assumed that a node in a halfway path has a request to open the channel 1 for another path and that the current channel is retracted to the channel λ2.

First, second digital optical transceivers of the transponders (TPND) are connected to each other with the channel λ2. Each of the transponders (TPND) evaluates an error correction and a delay of the path 2 and determines whether or not switching can be conducted. If an error correction and a delay at a specified point of time are not more than predetermined values, the transponder determines that switching can be conducted, then equalizes the delays, and conducts path switching.

When the switching succeeds, the channel 1 of the path 1 is opened.

Thus, optimization of channel configuration on the same path can be achieved without instantaneous interruption.

As described above, according to the present invention, signals can readily be switched during a switching operation of paths of signals. Thus, there can be provided an optical communication apparatus that can enhance a communication efficiency of data carried in an optical communication system.

Furthermore, a specific configuration of the present invention is not limited to the aforementioned embodiment. It should be understood that various changes and modifications may be made therein without departing from the spirit of the present invention.

What is claimed is:

1. An optical communication apparatus, comprising:
   a transponder comprising a plurality of transceivers operable in response to optical signals of different wavelengths through which data are received/transmitted, a switching part which switches the plurality of transceivers from one to another, and a switching controller controlling the switching part; and
   a reconfigurable optical add/drop multiplexer including a device that copes with a colorless function and a directionless function and is configured to operate in cooperation with the transponder,
   wherein each receiver of the plurality of the transceivers includes a receiver part which receives the optical signals of the different wavelengths and which outputs electric signals, and
   wherein the switching part is structured by a non-instantaneous-interruption switching part which includes a part for signal delay adjustment of the data received/transmitted through the different wavelengths.

2. The optical communication apparatus as recited in claim 1, wherein said each receiver of the plurality of the transceivers is structured by a wavelength division multiplexing (WDM) transceiver, a transmitter, and a receiver,
   wherein the transponder further comprises:
      a coupler which includes multiple inputs and a single output and which is connected to outputs of the plurality of transmitters, and
      a coupler which includes a single input and multiple outputs and which is connected to inputs of the plurality of receivers.

3. The optical communication apparatus as recited in claim 1, wherein the transponder includes an error correction part operable to perform an error correction.

4. The optical communication apparatus as recited in claim 1, wherein the transponder includes a channel controller operable to manage a channel of an optical signal transmitted to or received from the reconfigurable optical add/drop multiplexer based upon a control signal for determining a network path.

5. The optical communication apparatus as recited in claim 1, wherein the reconfigurable optical add/drop multiplexer includes a transceiver module connectable to a predetermined number of transmission lines, a wavelength cross connector module operable to switch optical signals, and an add part and a drop part connected to the transponder.

6. The optical communication apparatus as recited in claim 5, wherein the add part and the drop part are configured to be capable of coping with a plurality of paths.

7. An optical communication system, comprising:
   a plurality of nodes each including the optical communication apparatus as recited in claim 1.

8. The optical communication system as recited in claim 7, wherein a path of λ1 that is connected to the plurality of nodes is configured to automatically be switched into another path of λ2 that is different from λ1.

9. An optical communication system including a plurality of nodes each including an optical communication apparatus as recited in claim 1, wherein the transponder includes a wavelength division multiplexing (WDM) transceiver part including a plurality of transmitters and a plurality of receivers,
   wherein a coupler with multiple inputs and a single output is connected to outputs of the plurality of transmitters, and
   wherein a coupler with a single input and multiple outputs is connected to inputs of the plurality of receivers.

10. An optical communication system including a plurality of nodes each including an optical communication apparatus as recited in claim 1, wherein the transponder includes a non-instantaneous-interruption switching controller operable to control the non-instantaneous-interruption switching part.

11. An optical communication system including a plurality of nodes each including an optical communication apparatus as recited in claim 1, wherein the transponder includes a non-instantaneous-interruption switching controller operable to control the non-instantaneous-interruption switching part, and
   wherein the transponder further includes an error correction part operable to perform an error correction.

12. An optical communication system including a plurality of nodes each including an optical communication apparatus as recited in claim 1, wherein the transponder includes a channel controller operable to manage a channel of an optical signal transmitted to or received from the reconfigurable optical add/drop multiplexer based upon a control signal for determining a network path.

13. An optical communication system including a plurality of nodes each including an optical communication apparatus as recited in claim 1, wherein the reconfigurable optical add/drop multiplexer includes a transceiver module connectable to a predetermined number of transmission lines, a wavelength cross connector module operable to switch optical signals, and an add part and a drop part connected to the transponder.

14. An optical communication system including a plurality of nodes each including an optical communication apparatus as recited in claim 1, wherein the reconfigurable optical add/drop multiplexer includes a transceiver module connectable to a predetermined number of transmission lines, a wavelength cross connector module operable to switch optical signals, and an add part and a drop part connected to the transponder, and wherein the add part and the drop part are configured to be capable of coping with a plurality of paths.

15. A transponder, comprising:

a plurality of transceivers operable in response to optical signals of different wavelengths through which data are received/transmitted;

a switching part which switches the plurality of transceivers from one to another; and a client I/F transceiver part placed between the switching part and a plurality of clients, wherein the client I/F transceiver part comprises a multiplexer/demultiplexer connected to the switching part and the plurality of the clients, wherein the switching part is structured by a non-instantaneous interruption switch operable when the plurality of the transceivers are switched from one to another, and wherein the non-instantaneous interruption switch is operable to adjust and/or delay the data received/transmitted through the different wavelengths.

16. A transponder as recited in claim 15, further comprising a switching controller connected to the non-instantaneous interruption switch to equalize delays of the data.

\* \* \* \* \*